A. RASMUSSEN.
HOOP FASTENER.
APPLICATION FILED APR. 8, 1912.
1,086,217.
Patented Feb. 3, 1914.
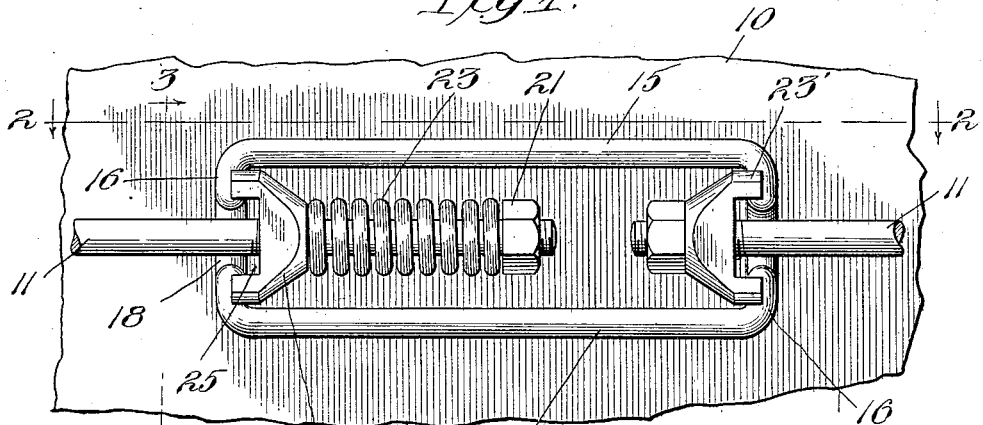
Witnesses:
Harry S. Gaither
J. E. Dowle
Inventor:
Andrew Rasmussen
by William W. Hall
Atty

UNITED STATES PATENT OFFICE.

ANDREW RASMUSSEN, OF RACINE JUNCTION, WISCONSIN.

HOOP-FASTENER.

1,086,217. Specification of Letters Patent. Patented Feb. 3, 1914.

Application filed April 8, 1912. Serial No. 689,142.

*To all whom it may concern:*

Be it known that I, ANDREW RASMUSSEN, a citizen of the United States, and a resident of Racine Junction, in the county of Racine and State of Wisconsin, have invented certain new and useful Improvements in Hoop-Fasteners; and I do hereby declare that the following is a full, clear, and exact description thereof, reference being had to the accompanying drawings, and to the characters of reference marked thereon, which form a part of this specification.

This invention relates to an improved hoop tightener for water tanks, silos and like inclosures, the walls of which are usually made of staves, and the invention consists in the matters hereinafter set forth and more particularly pointed out in the appended claims.

Among the objects of the invention is to provide an exceedingly simple and economical tightener for straining or drawing toward each other the two ends of a hoop, and a device in which the engaged ends of the hoop lie substantially in line with the body of the member of the fastener and in which the devices for connecting the ends of the hoop with the coupling member are arranged to permit of a pivotal action of the hoop ends relatively to the coupling member and thereby avoid tendency of the parts to bind one on the other and insure that the full straining force applied to the device is applied directly to the hoop ends.

In the drawings;—Figure 1 is a face view of a tank or silo wall, showing my improvements applied thereto. Fig. 2 is a section on the line 2—2 of Fig. 1. Fig. 3 is a section on the line 3—3 of Fig. 1. Fig. 4 is a side view of one of the pivotal blocks. Fig. 5 is an axial section thereof. Fig. 6 is an end view of said block.

As shown in the drawings, 10 designates the wall of the silo, tank or other inclosure and 11, 11 the ends of one of the hoops; 14 designates a coupling member, which as herein shown is of oblong rectangular shape and comprises the side members 15, 15 and the end members 16, 16. The said side members may lie generally parallel with each other, and, as herein indicated, are curved slightly to conform to the curvature of the tank wall 11.

The ends of the side members of the loop shaped coupling member are inclined outwardly away from the wall, as at 17, so as to space the end members 16 a distance from said wall, as best indicated in Fig. 2. The ends of the members 16 of the loop are centrally offset at 18 to constitute depressions of somewhat less depth than the diameter of the hoop ends 11. The said ends 11 of the hoops extend across the end members of the coupling at said depressions and into and through openings 19 in the blocks 20 placed just inside of and supported by the said closed ends of the looped coupling. The ends of the hoops 11 are screw-threaded and extend inwardly beyond said blocks 20 and are provided at their inner ends, inside the blocks, with the nuts 21, 21.

If desired, I may interpose a compression spring 23 between one of the blocks 20 and the nut 21 of the corresponding end of the hoop. As herein shown, but one spring is employed and the coupling loop is made of such length as to receive both ends of the hoops, while giving ample space for adjustment of the nuts thereon.

The blocks 20 are provided at their outer ends with laterally separated lugs 23', 23' which bear against the straight portions of the end members of the coupling loop at the sides of the depressed portions 17 thereof. The said projections are preferably provided with semi-cylindric notches 24 that engage over the cylindric portions 16 of the end members of the coupling. The engagement of the notch portions of the blocks laterally at the sides of the end portions of the loop coupling permits the blocks to swing or pivot about said end members, thereby giving a pivotal effect to the connection between the hoop ends and the ends of the coupling member. Such pivotal effect avoids all tendency of the hoop ends to bind against the walls of the openings in the blocks in a manner to prevent free slipping of said hoop ends endwise in said openings when tightening the hoop, such as would tend to occur if the said blocks were fixed or rigid with respect to the coupling members. The extension of the lugs 23' beyond the blocks forms between said lugs spaces 25 to permit the central parts of the blocks to clear the depressed or offset portions 17 of the end members, so as to permit the blocks freely to swing or pivot on the coupling member.

The advantage of the construction described, whereby the pivot blocks, which receive or are connected to the hoop ends, manifests itself most clearly in a construction wherein the wall of the tank is subject to periodic contraction and expansion, as in the wall of a silo tank. When the tank is empty, the wall of the tank becomes dry and the circumference of the tank diminishes. If the springs be employed between the ends of the hoops and the coupling member said springs may, to an extent, compensate for such decreasing diameter. On the other hand, when the tank is filled with wet ensilage the wall again expands and so increases the diameter of the tank. In the construction where the springs are not employed to take care of a reasonable variation of circumference, it is necessary to tighten or loosen the hoops to correspond with the decreasing or increasing circumference of the tank. In the variation of the circumference of the tank thus above noted it often occurs that the tank wall loses its true circular cross section. In such cases, if the blocks to which the hoop ends are attached be rigid with respect to the coupling loops or member, the openings in said blocks will be out of alinement with the axes of the hoop ends so that said hoop ends will bind against the walls of the openings in the blocks. When this occurs the springs will not be able to function to compensate for the variation of the circumference, or in the absence of springs, the binding effect of the hoop ends on the blocks will serve to prevent the hoops being properly tightened or, in any event, greatly increases the labor in tightening the hoops. By the use of the pivot blocks in the construction described these disadvantages are avoided and the hoop ends are free at all times to be adjusted relatively to the coupling member blocks.

The use of the spring or springs 23 permits the hoops to automatically adapt themselves to the tank wall regardless of the condition of moisture or the lack of moisture in the walls or in the surrounding atmosphere. Should the hoops be adjusted to the tank at a time when the wall is dry, the springs will permit the wall to expand when it becomes damp, either by reason of the dampness of the contents thereof or of the surrounding atmosphere. On the other hand when the wall contracts or decreases in diameter, by reason of the drying out of the material of the wall the spring tension on the hoops will cause the same to follow the contracting wall and maintain the staves thereof properly joined.

The said loop shaped coupling member may and desirably will be made of round stock, and after the loop has been formed and welded, the proper formation may be given to the ends thereof by a simple swaging or upsetting method in a bulldozer. The hoops or bands 11 are usually made of round stock, but when made of flat stock the screw-threaded ends thereof may be rounded to receive the screw-threads, or they may be left flat to receive other forms of attaching devices.

I claim as my invention:

1. In a hoop tightener, a coupling loop comprising side members and transverse end members, the side members being turned outwardly at the ends of said loop to deflect the transverse end members out of the plane of the side members, and blocks adapted to bear against and having pivotal engagement with the end members, and provided with openings to receive the hoop ends.

2. In a hoop tightener, a coupling loop comprising side members and end members, the side members of which are turned outwardly at the ends of said loop to deflect the end members out of the plane of the side members and the end members being offset between their ends, and blocks having pivotal engagement with said end members at the sides of the offset portions and provided in line with said offset portions with openings to receive the hoop ends.

3. In a hoop tightener, a coupling loop having side members and end members, which latter are offset between their ends, and blocks bearing against the end members at the sides of the offset portions thereof and provided in line with the offset portions with openings to receive the ends of the hoop.

4. In a hoop tightener, a coupling loop comprising side and end members, the side members being turned outwardly at the ends of said loop to deflect the end members out of the plane of the side members, and blocks at the ends of the loop and having openings to receive the hoop ends and laterally spaced bearing portions which engage the end members, the end members of the loop being curved or offset between their ends.

In testimony, that I claim the foregoing as my invention I affix my signature in the presence of two witnesses, this 3rd day of April, A. D. 1912.

ANDREW RASMUSSEN.

Witnesses:
G. E. DOWLE,
W. L. HALL.